(12) United States Patent
Richmond

(10) Patent No.: US 8,256,916 B2
(45) Date of Patent: Sep. 4, 2012

(54) LIGHT DEVICE

(76) Inventor: Simon N. Richmond, Princeton, NJ (US)

( * ) Notice: Subject to any disclaimer, the term of this patent is extended or adjusted under 35 U.S.C. 154(b) by 0 days.

(21) Appl. No.: 13/098,482

(22) Filed: May 1, 2011

(65) Prior Publication Data

US 2011/0205730 A1 Aug. 25, 2011

Related U.S. Application Data

(63) Continuation of application No. 11/555,175, filed on Oct. 31, 2006, now Pat. No. 7,967,465, which is a continuation-in-part of application No. 11/279,729, filed on Apr. 13, 2006, now Pat. No. 7,377,667, which is a continuation-in-part of application No. 11/057,077, filed on Feb. 11, 2005, now abandoned.

(30) Foreign Application Priority Data

Feb. 13, 2004 (AU) ................................ 2004900700

(51) Int. Cl.
*F21L 4/08* (2006.01)
*H01R 33/00* (2006.01)
(52) U.S. Cl. .......................... 362/183; 362/647; 362/649
(58) Field of Classification Search .................. 362/183, 362/145, 431, 800, 249.02, 647, 649, 652
See application file for complete search history.

(56) References Cited

U.S. PATENT DOCUMENTS

| 3,424,405 A | 1/1969 | Struble, Jr. |
| 3,696,283 A | 10/1972 | Ackley, III |
| 4,167,034 A | 9/1979 | Nogucki |
| 4,539,516 A | 9/1985 | Thompson |
| 4,568,868 A | 2/1986 | Schlepp et al. |
| 4,568,898 A | 2/1986 | Spinner |
| 4,626,852 A * | 12/1986 | Dodge .......................... 340/985 |
| 4,786,851 A | 11/1988 | Fuji et al. |
| 4,794,272 A | 12/1988 | Bavaro et al. |

(Continued)

FOREIGN PATENT DOCUMENTS

AU 2004200419 2/2004

OTHER PUBLICATIONS

U.S. Appl. No. 29/255,246, filed Mar. 1, 2006, Simon N. Richmond.

(Continued)

*Primary Examiner* — Thomas Sember
(74) *Attorney, Agent, or Firm* — Volpe and Koenig, P.C.

(57) ABSTRACT

A light device is disclosed which is arranged to receive at least one rechargeable electrical power storage device. The light device comprises a flexible body portion movable between an expanded configuration and a contracted configuration and defining an enclosure when the body portion is in the expanded configuration, the body portion being at least partially transparent or translucent. The light device also comprises at least one light emitting element which receives electrical power from the or each electrical power storage device disposed during use in the light device, the light emitting element being arranged so as to generate light which passes outwardly of the light device through the body portion, and a solar power converting device arranged to convert solar power to electrical power for recharging the or each electrical power storage device disposed during use in the light devices. The light device is disposable in an expanded configuration or a contracted configuration by respectively expanding or contracting the body portion.

20 Claims, 18 Drawing Sheets

U.S. PATENT DOCUMENTS

| | | | |
|---|---|---|---|
| 4,974,130 A | | 11/1990 | Friedman |
| 5,037,333 A | * | 8/1991 | Baubles .................. 439/722 |
| 5,055,984 A | * | 10/1991 | Hung et al. .................. 362/183 |
| 5,142,460 A | | 8/1992 | McAtee |
| 5,149,188 A | | 9/1992 | Robbins |
| 5,183,324 A | | 2/1993 | Thomas |
| 5,211,470 A | * | 5/1993 | Frost et al. .................. 362/183 |
| 5,367,442 A | * | 11/1994 | Frost et al. .................. 362/183 |
| 5,417,605 A | | 5/1995 | Chan |
| 5,686,809 A | | 11/1997 | Kimura et al. |
| 5,691,578 A | | 11/1997 | Driska |
| 5,791,773 A | | 8/1998 | Babineaux |
| 5,807,157 A | | 9/1998 | Penjuke |
| 5,811,958 A | | 9/1998 | Yamamoto |
| 5,819,917 A | | 10/1998 | Nicholson |
| 5,898,932 A | | 4/1999 | Zurio et al. |
| 5,936,380 A | | 8/1999 | Parrish |
| 5,967,564 A | * | 10/1999 | Gaucherot .................. 285/23 |
| 6,016,038 A | | 1/2000 | Mueller et al. |
| 6,020,823 A | | 2/2000 | DeCicco |
| 6,086,220 A | * | 7/2000 | Lash et al. .................. 362/244 |
| 6,112,414 A | | 9/2000 | Andis et al. |
| 6,150,774 A | | 11/2000 | Mueller et al. |
| 6,254,247 B1 | | 7/2001 | Carson |
| 6,288,522 B1 | | 9/2001 | Odaohhara et al. |
| 6,305,827 B1 | | 10/2001 | Nolle |
| 6,356,054 B1 | | 3/2002 | Herrmann |
| 6,406,163 B1 | * | 6/2002 | Yang .................. 362/183 |
| 6,459,919 B1 | | 10/2002 | Lys et al. |
| 6,476,311 B1 | | 11/2002 | Lee et al. |
| 6,511,197 B1 | | 1/2003 | Kalemjian |
| 6,573,659 B2 | | 6/2003 | Toma et al. |
| 6,608,453 B2 | | 8/2003 | Morgan et al. |
| 6,784,357 B1 | * | 8/2004 | Wang .................. 136/244 |
| 6,812,398 B2 | | 11/2004 | Yueh |
| 6,963,275 B2 | | 11/2005 | Smalls |
| 6,977,479 B2 | | 12/2005 | Hsu |
| 7,011,426 B2 | | 3/2006 | Gabor |
| 7,021,787 B1 | * | 4/2006 | Kuelbs .................. 362/183 |
| 7,040,776 B2 | | 5/2006 | Harrell et al. |
| 7,048,403 B2 | | 5/2006 | Parker et al. |
| 7,088,259 B2 | | 8/2006 | Armbruster et al. |
| 7,285,934 B2 | | 10/2007 | Chang |
| 7,497,588 B2 | | 3/2009 | Browder |
| 7,513,638 B2 | | 4/2009 | Allsop et al. |
| 7,967,465 B2 | | 6/2011 | Richmond |
| 2002/0003697 A1 | | 1/2002 | Chen |
| 2002/0053879 A1 | | 5/2002 | Thoma et al. |
| 2002/0105794 A1 | | 8/2002 | Hanscom et al. |
| 2005/0117344 A1 | | 6/2005 | Bucher et al. |
| 2005/0279403 A1 | | 12/2005 | Kube |
| 2006/0012978 A1 | | 1/2006 | Allsop et al. |
| 2006/0027796 A1 | | 2/2006 | O'Connor |
| 2007/0019401 A1 | | 1/2007 | Liebowitz et al. |
| 2007/0183143 A1 | | 8/2007 | Allsop et al. |

OTHER PUBLICATIONS

Seven (7) attached photographs taken by the Inventor, Simon N. Richmond in an unknown factory on Aug. 16, 2004 (unpublished) in Dongguan, China of a Color Changing Ornament Light Set with UL Approved Transformer UPC-A:012495746226 branded "Christmas Avenue" by Atico International, USA, Inc.

The IEEE Standard Dictionary of Electrical and Electronics Terms, Sixth Edition, IEEE Std 100-1996, (Introductory page and p. 207—Displaying a general definition for the term "contact"), Published Apr. 8, 1997.

* cited by examiner

LIGHT DEVICE

CROSS REFERENCE TO RELATED APPLICATION

This application is a continuation of application Ser. No. 11/555,175 filed on Oct. 31, 2006, now U.S. Pat. No. 7,967,465, which is a continuation in part of application Ser. No. 11/279,729 filed on Apr. 13, 2006, now U.S. Pat. No. 7,377,667, which is a continuation in part of U.S. patent application Ser. No. 11/057,077 filed on Feb. 11, 2005, now abandoned, which claims priority from foreign application Australia Serial Number 2004900700 filed on Feb. 13, 2004, which are all incorporated herein by reference.

FIELD OF THE INVENTION

The present invention relates to a light device.

BACKGROUND OF THE INVENTION

It is known to provide a light device which includes a light source in the form of one or more LEDs, batteries arranged to supply power to the LEDs, and a control unit arranged to cause the LEDs to emit light which flickers. In one such prior art light device, the LEDs are disposed inside a lantern-type housing.

However, with this arrangement, the batteries are often disposed in a lid portion of the housing and electrically connected to the LEDs in the housing. As a consequence, the task of replacing the batteries is relatively cumbersome.

It is a long standing US tradition to place candles in the windows of a home during the Christmas holiday season so that the candles are visible from outside the windows.

Due to the danger associated with an open flame, electric candle systems have evolved to take the place of traditional candles. Such electrical candles are typically supported by an inner ledge or interior sill of a double hung window, or on ledges adjacent the windows.

However, electrical candles increase household electricity costs and conventional indoor electrical candles not properly fastened or mounted can be a fire and safety hazard.

As the cost of key components used in the construction of consumer solar garden pathway lights such as solar cells, light emitting diodes, and rechargeable batteries falls, a dramatically increasing factor in the total cost of low cost solar lights to a retailer is the cost of freight, in particular since the majority of consumer solar lights are made in low cost labor countries far from their intended customers. Due to the low weight to volume ratio, freight charges for solar lights are substantially based on physical volume. Further, sales of solar lights are mostly seasonal over the summer and consequently any excess inventory requires costly long term storage.

SUMMARY OF THE INVENTION

In accordance with a first aspect of the present invention, there is provided a light device comprising:

a first portion configured so as to partially define a housing, the first portion being arranged so as to at least partially pass light therethrough and the first portion including first electrical contacts and a first locking device;

a light emitting element disposed in the first portion and being electrically connected to the first electrical contacts; and a second portion including a battery compartment, second electrical contacts arranged so as to be in electrical connection with batteries disposed in the battery compartment during use, and a second locking device engageable with the first locking device so as to releasibly fix the second portion to the first portion during use and thereby close the housing;

the arrangement being such that, during use, when the first and second locking devices are engaged with each other, the first electrical contacts electrically connect with the second electrical contacts so as to thereby electrically connect batteries disposed in the battery compartment during use to the at least one light emitting element.

One of the first and second locking devices may include at least one generally L-shaped member provided with an outwardly extending locking member, and the other of the first and second locking devices may include at least one cavity portion and at least one associated projection, each projection locating under a locking member when the first and second locking devices are engaged with each other.

Preferably, four L-shaped members are provided and four corresponding cavity portions and projections.

Preferably, the first locking device includes the at least one generally L-shaped member and the second locking device includes the at least one cavity portion and at least one associated projection.

In one arrangement, each first electrical contact includes a raised portion arranged so as to encourage good electrical contact with a second electrical contact during use.

In one arrangement, each second electrical contact is formed of resilient material so as to encourage good electrical contact with a first electrical contact during use.

In one arrangement, the first portion is a base portion of the light device, and the second portion is a lid portion of the light device.

In one arrangement, the base portion includes at least one transparent panel and a simulated candle having at least one light emitting element disposed in the simulated candle, the simulated candle being arranged so as to diffuse light passing therethrough from the at least one light emitting element.

In an alternative arrangement, the base portion includes at least one translucent panel and the at least one light emitting element is disposed in the base portion such that light from the at least one light emitting element is diffused by the at least one translucent panel. The or each translucent panel may be formed of frosted glass.

In one embodiment, the light device further comprises a control unit for causing the at least one light emitting element to emit flickering light. The light device may further be arranged such that the control unit is activatable and deactivatable under control of a user so as to activate or deactivate flickering of the at least one light emitting element.

The or each light emitting element may be an LED. Each LED may be arranged so as to emit yellow or amber coloured light.

In one arrangement, the light device includes a solar power converting device arranged to convert solar power to electrical power, and an electrical power storage device arranged to store electrical power provided by the solar power converting device.

The light device may be of lantern-type appearance.

In accordance with a second aspect of the present invention, there is provided a light device comprising:

a housing portion arranged to receive at least one rechargeable electrical power storage device;

a light source which receives electrical power from the or each electrical power storage device disposed during use in the housing portion;

a solar power converting device arranged to convert solar power to electrical power for recharging the or each electrical power storage device disposed during use in the housing portion; and a fixing device arranged to facilitate fixing of the light device to a window pane so that the light source is visible through the window pane;

wherein the solar power converting device is disposed relative to the light device such that when the light device is fixed to an inwardly facing side of a window pane, the solar power converting device is disposed adjacent and substantially parallel to the window pane.

In one arrangement, the fixing device comprises at least one suction cup. Three suction cups may be provided disposed adjacent a periphery of the solar power converting device.

In one arrangement, the light source includes an at least partially transparent casing and at least one light emitting element disposed in the casing, the casing being arranged so as to pass or at least partially diffuse light passing therethrough from the at least one light emitting element.

In one embodiment, the light device further comprises a control unit for causing the at least one light emitting element to emit flickering light. The light device may further be arranged such that the control unit is activatable and deactivatable under control of a user so as to activate or deactivate flickering of the at least one light emitting element.

The or each light emitting element may be an LED. Each LED may be arranged so as to emit yellow or amber coloured light.

In accordance with a third aspect of the present invention, there is provided a light device arranged to receive at least one rechargeable electrical power storage device, the light device comprising:

a flexible body portion movable between an expanded configuration and a contracted configuration and defining an enclosure when the body portion is in the expanded configuration, the body portion being at least partially transparent or translucent;

at least one light emitting element which receives electrical power from the or each electrical power storage device disposed during use in the light device, the light emitting element being arranged so as to generate light which passes outwardly of the light device through the body portion; and a solar power converting device arranged to convert solar power to electrical power for recharging the or each electrical power storage device disposed during use in the light device;

wherein the light device is disposable in an expanded configuration or a contracted configuration by respectively expanding or contracting the body portion.

The body portion may include at least one strengthening frame arranged to encourage the body portion to maintain a desired shape when the body portion is in the expanded configuration.

The light device may further comprise at least one support element arranged to define a predetermined distance between upper and lower portions of the body portion so as to thereby encourage the body portion to maintain a desired shape when the body portion is in the expanded configuration.

In one arrangement, the light device further comprises a transparent or translucent member, which may be a flexible clear plastic acetate lens, provided with indicia, patterns and so on, the transparent or translucent member being removably positioned in the body portion such that during operation the indicia and/or patterns appear on the surface of the body portion.

In one arrangement, the body portion includes indicia and/or patterns.

In one embodiment, the light device further comprises a control unit for causing the at least one light emitting element to emit flickering light. The light device may further be arranged such that the control unit is activatable and deactivatable under control of a user so as to activate or deactivate flickering of the at least one light emitting element.

The or each light emitting element may be an LED. Each LED may be arranged so as to emit yellow or amber coloured light.

BRIEF DESCRIPTION OF THE DRAWINGS

The present invention will now be described, by way of example only, with reference to the accompanying drawings, in which.

DETAILED DESCRIPTION OF AN EMBODIMENT OF THE INVENTION

Figure 1:
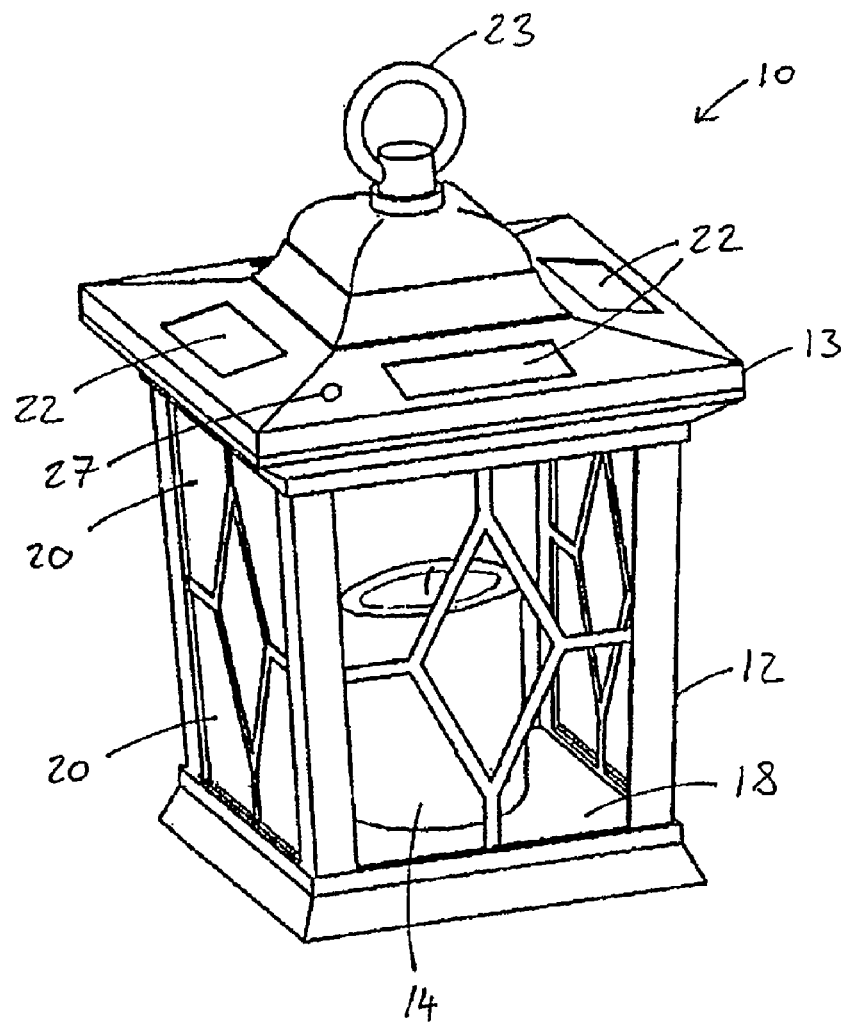
FIG. 1 is a diagrammatic perspective view of a light device in accordance with an embodiment of the present invention.

Referring to the drawings, there is shown a light device 10 which includes a base portion 12 and a lid portion 13. The light device 10 is of lantern-type appearance.

Mounted on the lid portion and disposed inside the base portion 12 during use is a light source. In this example, the light source is in the form of a simulated candle 14 having one or more light emitting elements such as LEDs 15 disposed inside the simulated candle 14. The simulated candle 14 is arranged so that light passing through the simulated candle 14 from the light emitting elements is diffused.

The or each LED 15 may be of a type which emits yellow or amber light.

The base portion 12 includes transparent panels 20, although it will be understood that as an alternative to providing a simulated candle which diffuses light from the LEDs 15, a plurality of translucent panels may be provided to diffuse light passing through the panels during use. In this example, the translucent panels may be frosted glass, although it will be understood that other translucent panels may be used.

The light device 10 also includes a solar power converting device, in this example in the form of solar panels 22, which serves to convert solar power to electrical power. The solar panels 22 may be in the form of encapsulated polycrystalline PV solar panels or any other suitable solar power converting device.

The light device 10 also includes means, in this example a ring member 23, for facilitating hanging of the light device 10 from a structure. However, it will be understood that any suitable hanging means may be provided.

In an alternative embodiment or additionally, the light device 10 may include a spike extending downwardly from a lower wall portion 18 of the light device 10, the spike for example facilitating mounting of the light device 10 to a ground portion of a garden.

Figure 2:
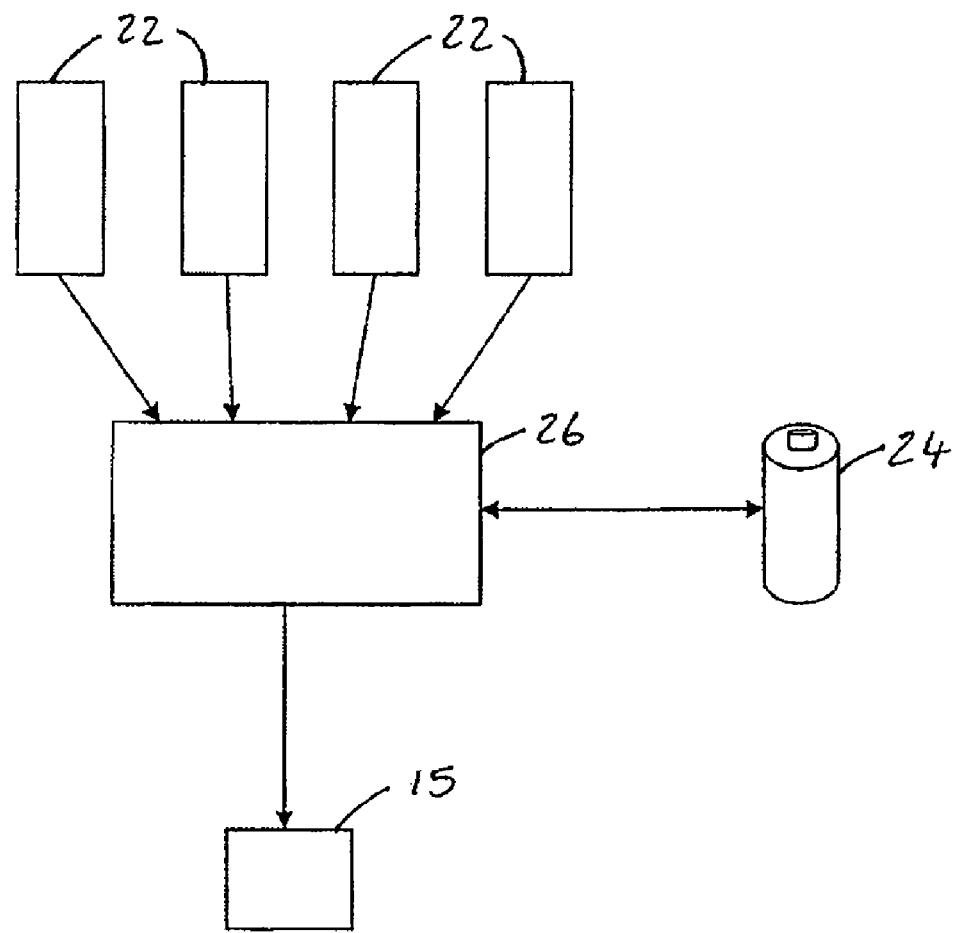
FIG. 2 is a block diagram showing components of the light device shown in FIG. 1.

As shown in FIG. 2, electrical power supplied by the solar panels 22 serves to recharge a rechargeable power source, in this example rechargeable batteries 24 which may be NiCd batteries.

In order to coordinate supply of electrical power from the solar panels 22 to the rechargeable batteries 24 and from the rechargeable batteries 24 to the light source 14, a control unit 26 is provided.

The control unit 26 may also be arranged to sense the ambient light level, for example using a light dependent resistor 27, to cause illumination of the LED(s) 15 when the ambient light level falls below a predetermined level.

The light device 10 may also be arranged to receive power directly from an external power supply, for example by providing the light device 10 with an appropriate step-down transformer (not shown) connectable to mains AC electrical power and appropriate AC to DC conversion circuitry.

In order to cause the or each LED 15 in the light source to flicker, the control unit 26 may be provided with an inverter (not shown) and the inverter controlled so as to generate an alternating current arranged so as to cause the LED(s) 15 to mimic the characteristic flicker of a flame. Alternatively, an irregular oscillating input may be applied to a switching transistor so as to cause irregular switching of current through the LED(s) 15. Appropriate biasing signals for the switching transistor may be generated using multiple oscillators, each of which is arranged to oscillate at a different frequency. For example, a base of the switching transistor may be connected to outputs of multiple Schmitt trigger oscillators arranged to oscillate at different frequencies, the Schmitt trigger oscillators for example being constructed using a CMOS 40106 hex inverting Schmitt trigger integrated circuit.

The control unit 26 may be controllable so that the light source may be caused to flicker or to not flicker, for example in response to input from a manually operable switch.

It will be understood that the simulated candle 14 causes the flickering light to diffuse and thereby provide an effect which more closely resembles the effect produced by a flickering candle than light devices known hitherto.

Figure 3:
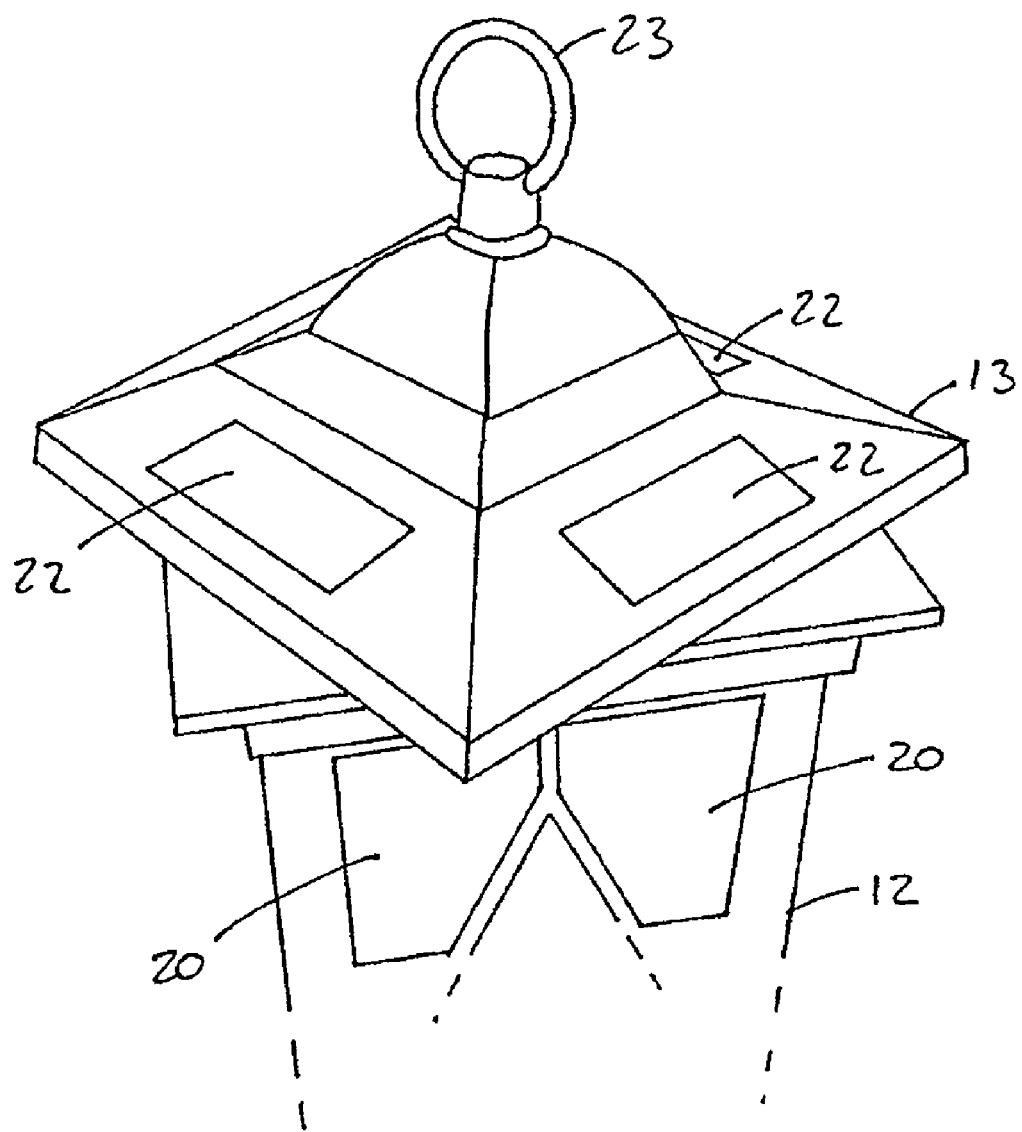
FIG. 3 is a diagrammatic perspective view of the light device shown in FIG. 4 with a lid portion of the light device shown rotated relative to a base portion of the light device.

The lid portion 13 is removably attachable to the base portion 12 by rotating the lid portion 13 relative to the base portion 12, as shown in FIG. 3.

Figure 4:
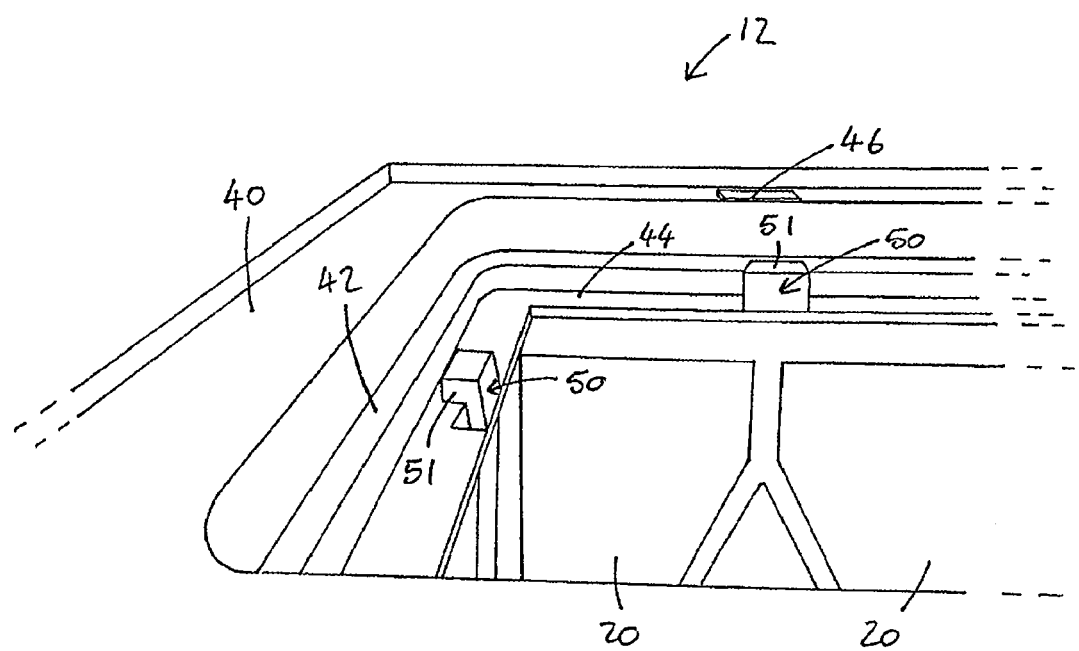
FIG. 4 is a diagrammatic perspective view of an upper portion of the base portion the light device shown in FIG. 1.
Figure 5:
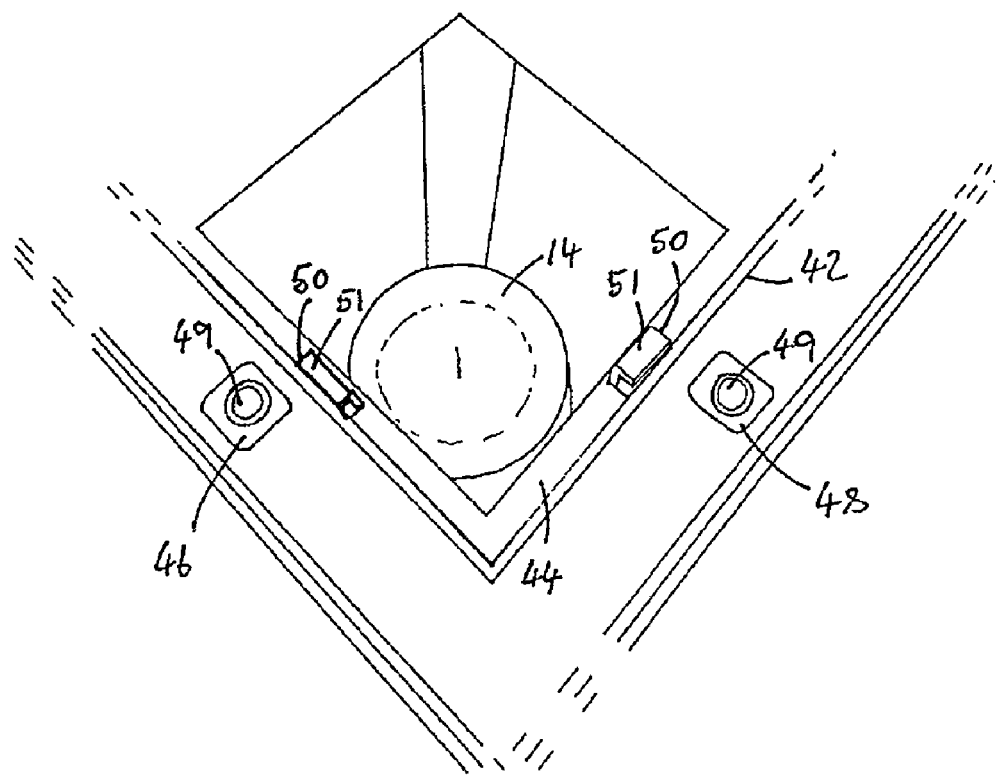
FIG. 5 is a further diagrammatic perspective view of the upper portion of the base portion shown in FIG. 4.

As shown more particularly in FIGS. 4 and 5, an upper portion of the base portion 12 is of generally recessed configuration and includes first, second and third ledge portions 40, 42 and 44 respectively.

Mounted on the first ledge portion 40 are first electrical contacts 46, 48 electrically connected to the light source, each of the first electrical contacts 46, 48 including a raised portion 49 shown more particularly in FIG. 5. The first electrical contacts 46, 48 are formed of resilient electrically conductive material.

Integral with the third ledge portion 44 are a plurality of first locking device 50, in this example in the form of four generally L-shaped members (only two of which are shown in FIGS. 4 and 5) arranged such that respective locking members 51 of the L-shaped members extend outwardly of the base portion 12.

Figure 6:
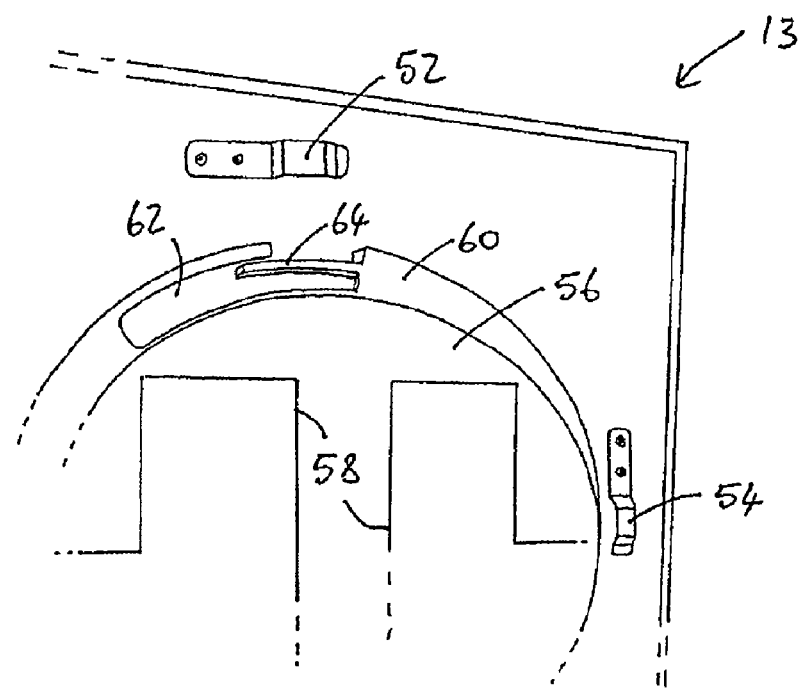
FIG. 6 is a diagrammatic perspective view of a lower portion of the lid portion of the light device shown in FIG. 1.

As shown more particularly in FIG. 6, a lower portion of the lid portion 13 includes second electrical contacts 52, 54 respectively, and a battery compartment 56 provided with closure members 58 removable from the battery compartment 56 so as to facilitate insertion of batteries not shown) into the battery compartment 56.

The lower portion of the lid portion 13 also includes a lip portion 60 extending around the periphery of the battery compartment 56. The lip portion 60 includes second locking devices, in this example in the form of a cavity portion 62 and a projection 64.

It will be understood that the first and second locking devices 50, 62, 64 are arranged such that when the lid portion 13 is disposed on the base portion 12 and rotated relative to the base portion 12, the first and second locking devices mechanically engage with each other so as to fix the lid portion 13 relative to the base portion 12. In this example, when the lid portion 13 is disposed on the base portion 12 and rotated relative to the base portion 12, the L-shaped member 50 locates in the cavity portion and the projection 64 locates under the locking member 51. However, it will be understood that other locking arrangements are envisaged, the important aspect being that the base portion 12 and the lid portion 13 are provided with complimentary locking devices arranged to facilitate mechanical engagement between the base portion 12 and the lid portion 13.

It will also be understood that when the lid portion 13 is disposed on the base portion 12 and rotated relative to the base portion 12, the first electrical contacts 46, 48 make electrical contact with the second electrical contacts 52, 54 so that electrical power from the batteries is supplied to the light source. The resilience of the first electrical contacts 46, 48 and the presence of the raised portions 49 on the second electrical contacts 52, 54 ensures that good electrical contact is achieved between the first electrical contacts 46, 48 and the second electrical contacts 52, 54 during use.

It will be appreciated that the lid portion 13 is both mechanically and electrically connectable to and disconnectable from the base portion 12 by disposing the lid portion 13 on the base portion 12 and rotating the lid portion relative to the base portion 12. In this way, the lid portion 13 serves as a self-contained power source and in embodiments which include solar panels 22 and rechargeable batteries, the lid portion serves as a self-contained solar rechargeable power source.

Furthermore, it will be appreciated that since the lid portion 13 is self-contained, the task of replacing the batteries is less cumbersome than with comparable light devices known hitherto.

Moreover, the invention is also applicable to other light devices and other electrical apparatus in general wherein it is desirable to provide a self-contained power source which is both mechanically and electrically connectable to an electrical apparatus requiring electrical power.

Figure 7:
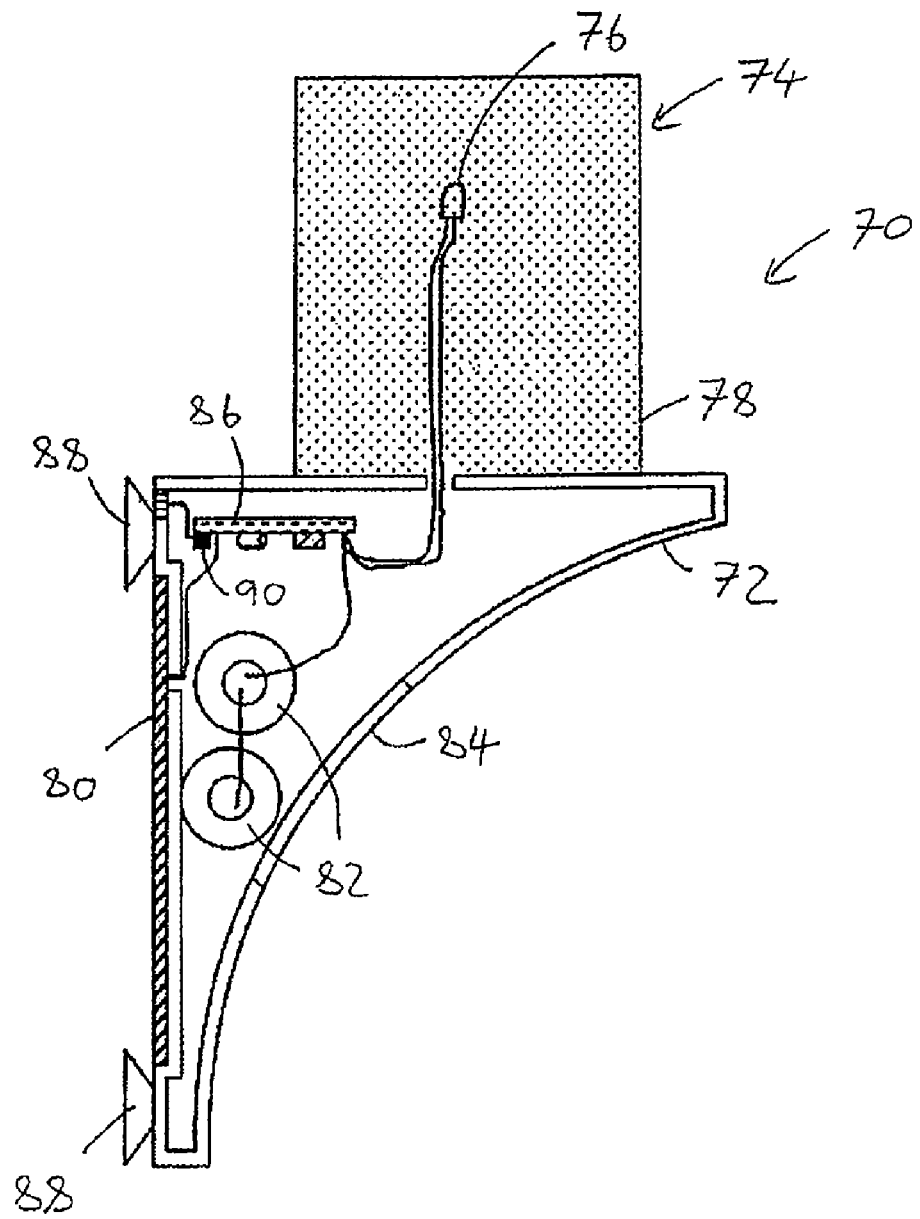
FIG. 7 is a diagrammatic cross-sectional view of a light device in accordance with an alternative embodiment of the present invention.
Figure 8:
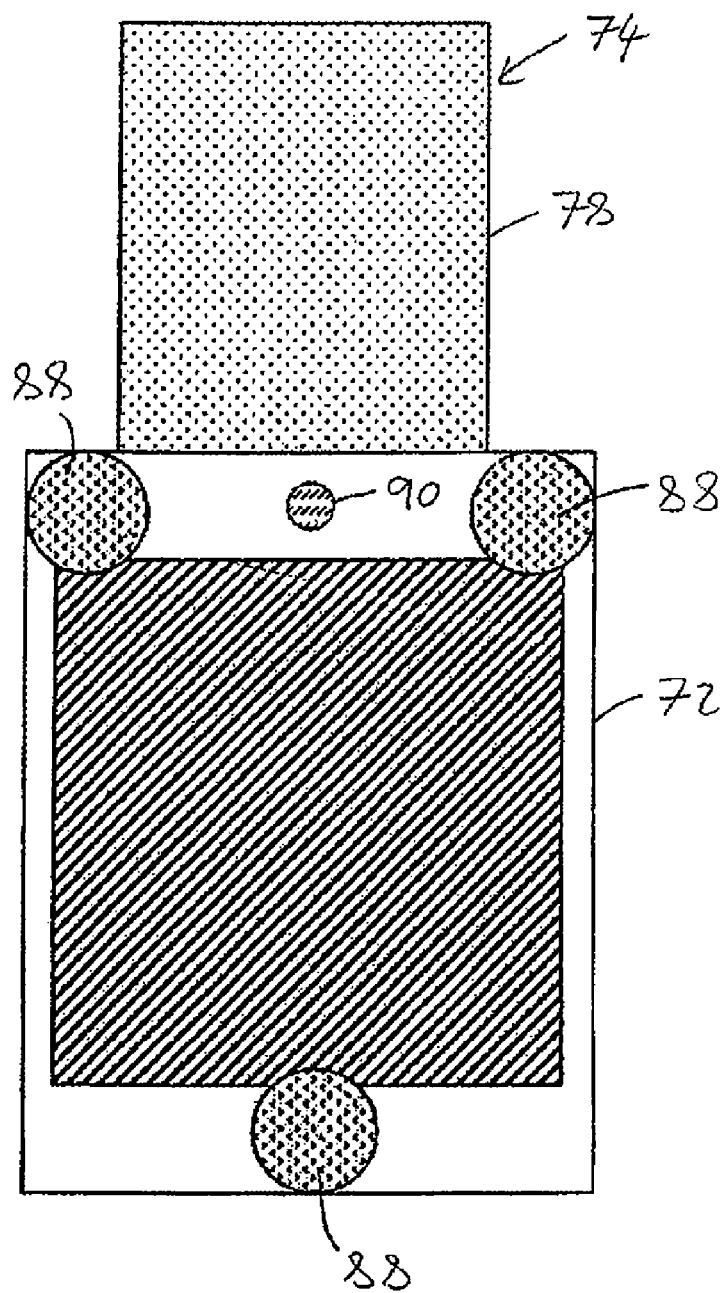
FIG. 8 is a diagrammatic front view of the light device shown in FIG. 7.
Figure 9:
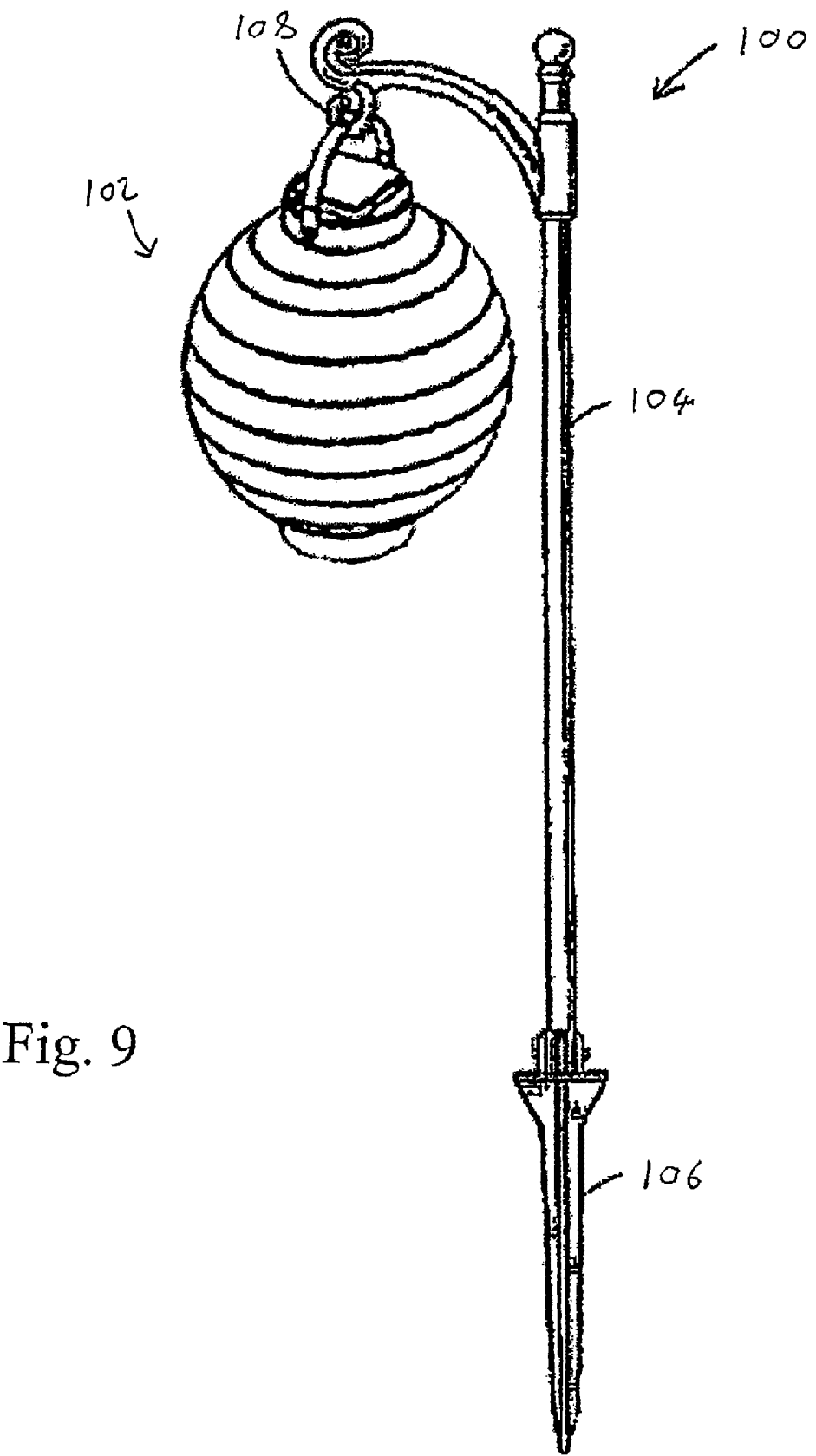
FIG. 9 is a diagrammatic perspective view of a light assembly including a light device in accordance with a further alternative embodiment of the present invention.

A light device 70 in accordance with an alternative embodiment is shown in FIGS. 7 and 8. The light device 70 is of a type which is mountable adjacent an interior face of a window during use so that light emanating from the light device 70 is viewable from a location outside the window.

The light device 70 includes a housing 72 which may be formed of metal, plastics, wood or any other suitable material, and a light source 74 mounted above and supported by the housing 72. In this example, the light source 74 includes one or more light emitting elements, in this example in the form of LEDs 76, disposed inside a generally cylindrical casing 78. The casing 78 may be formed of transparent or translucent material and in this example is formed of lightweight thermoplastic polymer material such as ABS or polypropylene.

Mounted on the housing 72 is a solar power converting device, in this example a solar panel 80. The solar panel 80 is disposed on the housing 72 such that during use the solar panel 80 extends in a generally vertical direction. The solar panel 80 may be formed of amorphous silicon or crystalline silicon.

Disposed in the housing 72 is a rechargeable power source, in this example in the form of two rechargeable batteries 82 which may be nickel cadmium batteries, nickel metal hydride batteries, rechargeable alkaline batteries, lead acid batteries, lithium ion batteries or any other suitable rechargeable electrical power source. A removable lid 84 is also provided so as to allow access to the housing 72 and thereby the rechargeable batteries 82.

The light device 70 also further includes a circuit board 86 provided with operative components arranged to cause the LED(s) 76 to illuminate in accordance with a predetermined scheme. For example, the operative components may cause the LED(s) 76 to operate in a similar way to the above embodiment described in relation to FIGS. 1 to 6, wherein the batteries 82 are recharged using power generated by the solar panels 80, and power in the batteries 82 is used to illuminate the LED(s) 76 only when the ambient light level has fallen below a predetermined level. As with the embodiment shown in FIGS. 1 to 6, this may be achieved using a light dependent resistor 90 which provides an appropriate signal to the circuit board 86 to effect switching of power to the light source 74. The operative components may also be arranged so as to cause the LED(s) 76 to flicker, for example so as to mimic the characteristic flicker of a flame, so as to vary the intensity or colour of one or more LED(s) 76 and so on, as described above in relation to the embodiment shown in FIGS. 1 to 6.

The light device 70 also includes fixing means 88 arranged to facilitate removable fixing of the light device 70 to an interior face of a window. In this example, the fixing means 88 is in the form of three suction cups 88 disposed adjacent a periphery of the solar panel 80. In this way, the light device 70 is removably fixable to an interior face of a window such that the solar panel 80 is disposed immediately adjacent and generally parallel to the window. This enables light passing through the window to fall directly on the solar panel 80 and thereby provide efficient charging of the rechargeable power source 82 whilst enabling light from the light source 74 to be readily visible from outside the window.

A light assembly 100 including a light device 102 in accordance with a further alternative embodiment is shown in FIGS. 9 to 20.

The light device 102 in this example is suspended on a support device 104 provided with a stake 106 and a hook 108. However, it will be understood that various types of support device are envisaged.

As shown more particularly in FIGS. 10 to 13, the light device 102 includes a hollow body 110 which is closed at lower and upper ends by lower and upper caps 112 and 114 respectively. The light device 102 is suspended from the hook 108 using a strap 116 which is pivotably connected to the upper cap 114 at pivot connections 118. Disposed on the upper cap 114 is a solar panel 120.

Figure 10:
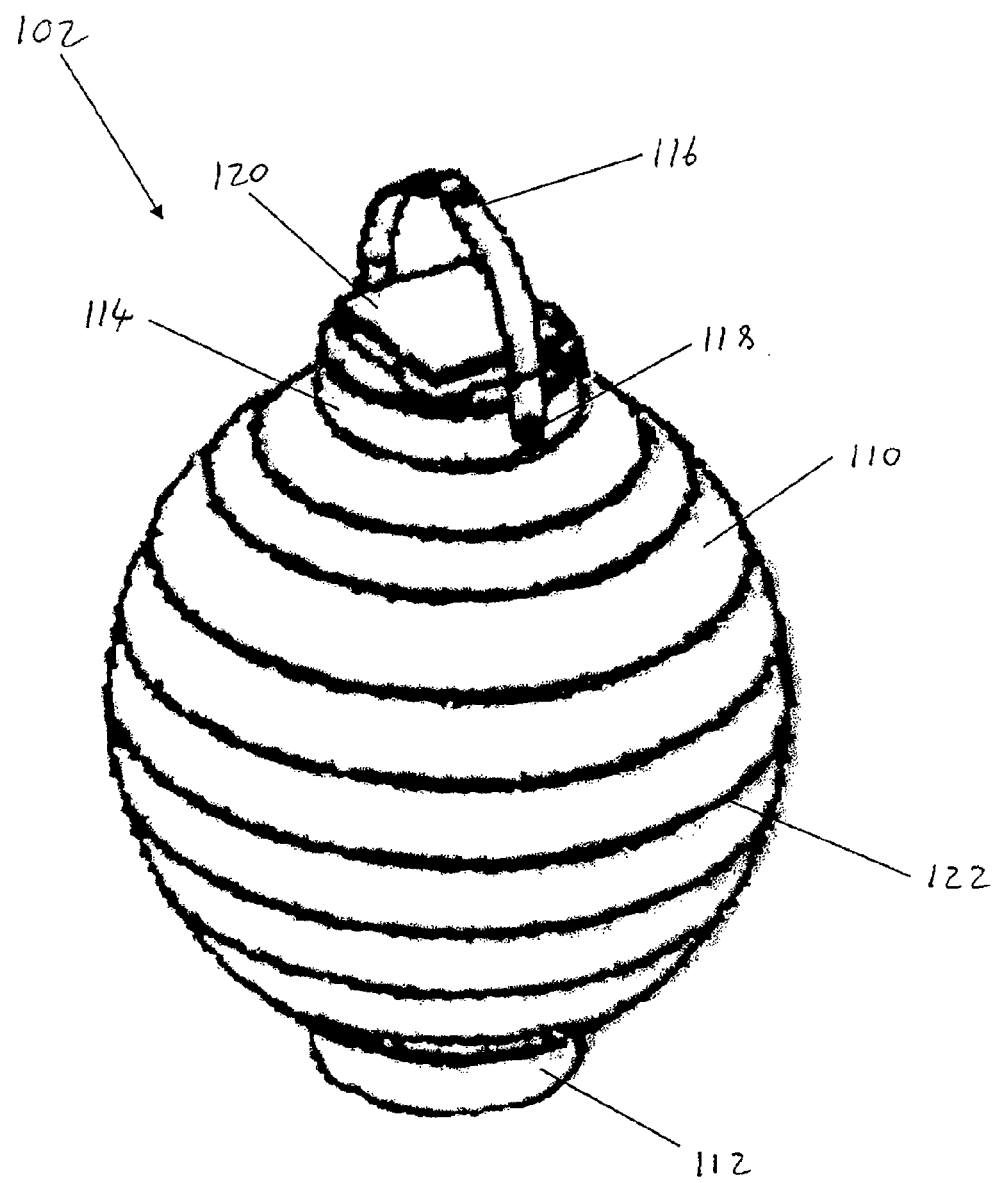
FIG. 10 is a diagrammatic perspective view of the light device shown in FIG. 9, with the light device shown in an expanded configuration.
Figure 11:
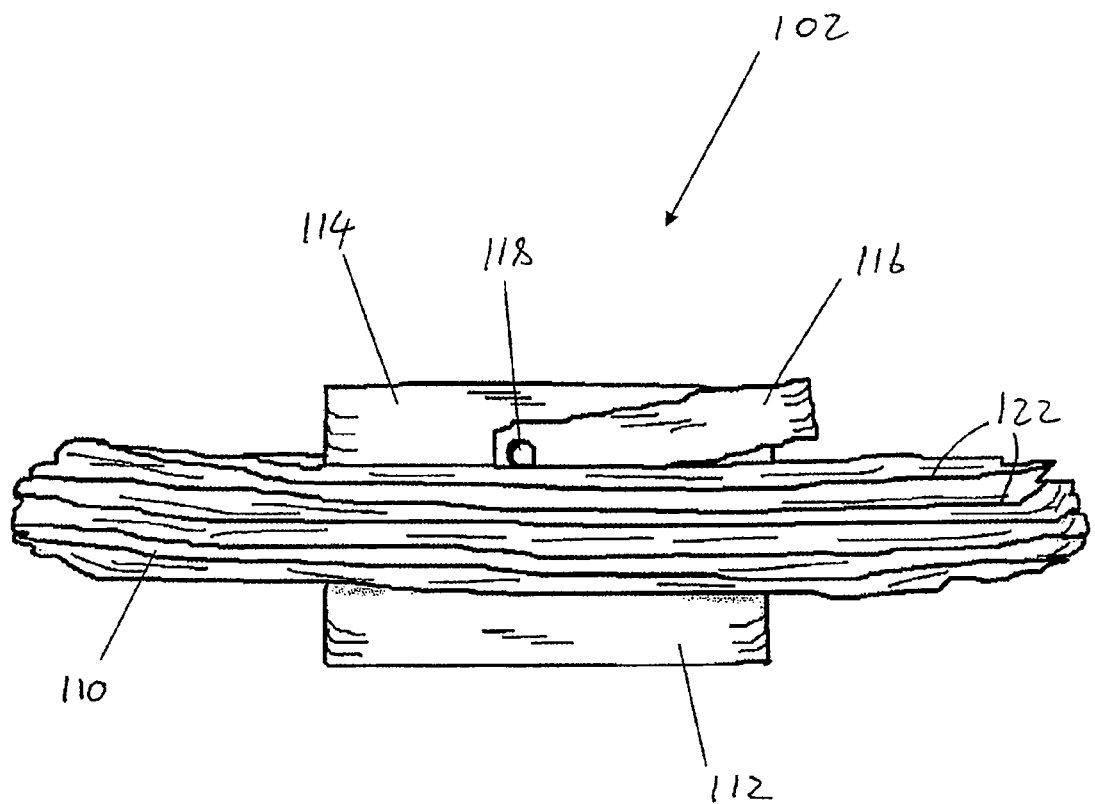
FIG. 11 is a diagrammatic representation of the light device shown in FIG. 10, with the light device shown in a contracted configuration.

In the present example, the body 110 is a diffuser body formed of material which diffuses light passing through the body 110, and which is sufficiently flexible that the light device 102 is disposable in an expanded configuration as shown in FIG. 10 and a contracted configuration as shown in FIG. 11. For this purpose, the body 110 may be formed of translucent flexible plastics material having optical transmissive properties similar to rice paper.

In the present example, in order to assist in maintaining a desired shape when the light device 102 is disposed in the expanded configuration, one or more frame members 122 may be provided, in this example a plurality of circular frame member 122 disposed at evenly spaced locations between the lower and upper caps 112, 114, or a helical frame member.

The frame members 122 may be formed of any suitably strong material which is preferably relatively resistant to corrosion. The body 110 likewise is preferably formed of relatively weather resistant material, and may be provided with indicia, patterns, artwork, and so on. For example, the body 110 may be printed with a pumpkin design for Halloween, snowflakes for Christmas, and so on.

As shown in FIG. 11, since the strap 116 is pivotably connected to the upper cab 114, the strap 116 is able to lie generally parallel to the frame members 122 when the light device 102 is in the contracted configuration.

Figure 12:
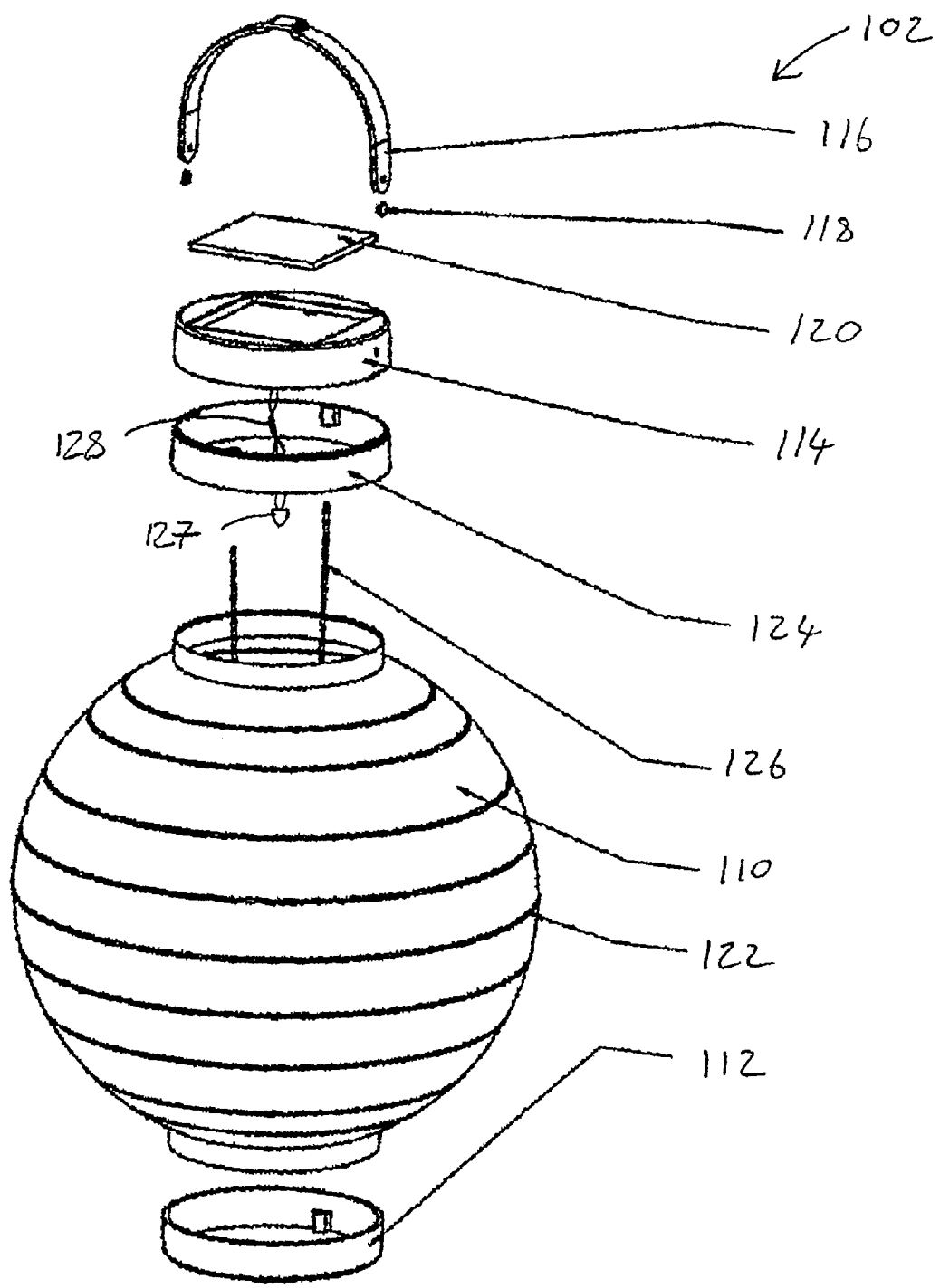
FIG. 12 is a diagrammatic exploded perspective view of the light device shown in FIGS. 10 and 11.
Figure 13:
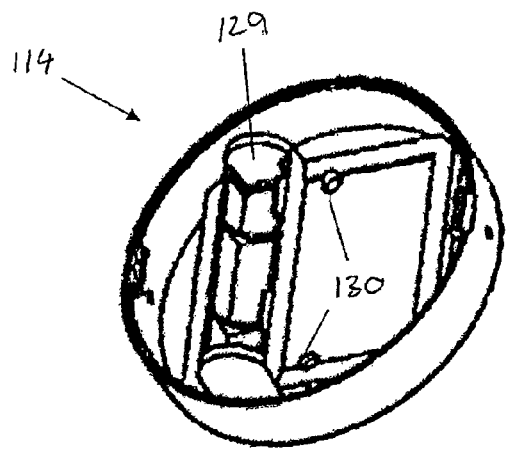
FIG. 13 is a diagrammatic perspective view of an upper cap of the light device shown in FIGS. 9 to 12.

As shown more particularly in FIG. 12, the light device 102 in this example includes flexible support elements 126 which extend between the upper cap 114 and the lower cap 112, the support elements 126 serving to define a predetermined distance between the upper and lower caps 112, 114 so as to thereby assist in maintaining the shape of the body 110 when the light device 102 is in the expanded configuration. In particular, the support elements 126 serve to restrict the body 110 from moving to the contracted configuration, for example due to a biasing force exerted by the circular frame members.

As shown in FIG. 12, the light device 102 may further include an inner cap 124 connected to the body 110 and releasably engageable with the upper cap 114. For this purpose, the caps 114, 124 may comprise corresponding screw threaded portions. In this way, operative components of the light device 102 may be selectively engaged with different diffuser bodies depending on the desired effect.

In FIGS. 8 to 12 of the drawings, the upper and lower caps 112, 114 are shown disposed externally of the body 110. However, it will be understood that other variations are possible. For example, one or both caps 112, 114 may be disposed internally of the body 110.

In addition or alternatively, a transparent or translucent member, which may be a flexible clear plastic acetate lens, provided with indicia, patterns and so on may be removably positioned in the body 110 such that during operation the indicia and/or patterns appear on the surface of the body 110. One embodiment has one or more partially transparent acetate sheets or a similar material with printed logos, words, or designs on them. The sheets may be polygonal or a cylindrical or any other shape.

The operative components disposed in the upper cap 114 include a light emitting device 127, in this example an LED, the LED extending into an enclosure defined by the body 110 and being supported by flexible electrical wires 128.

One or more LEDs 127 may be provided and the or each LED may be of a type which emits yellow or amber light. In addition, operative components of the light device 102 disposed in the upper cap 114 may be arranged so as to illuminate the or each LED in accordance with a predetermined scheme. For example, the operative components may be arranged to illuminate the or each LED in a manner as described in co-pending U.S. patent application Ser. Nos. 10/789,488 or 11/102,229 by the present applicant, the contents of which are hereby incorporated by reference.

While the present embodiment is described in relation to a generally spherical body 110, it will be understood that any shape is envisaged such as ovoid, cylindrical, conical, rectangular, cuboid, and so on.

The light device 102 includes operative components disposed in the upper cap 114 which control and determine the illumination scheme of the or each LED 127. The operative components may be arranged so as to operate in the same way as the operative components described in relation to FIGS. 1 to 6 of the first embodiment described above. For this purpose, the operative components include a solar panel 120 mounted in the upper cap 114 and a battery compartment 129 formed in the upper cap 114. Apertures 130 are also provided in the upper cap 114 for receiving electrical wires associated with the solar panel 120.

Figure 18:
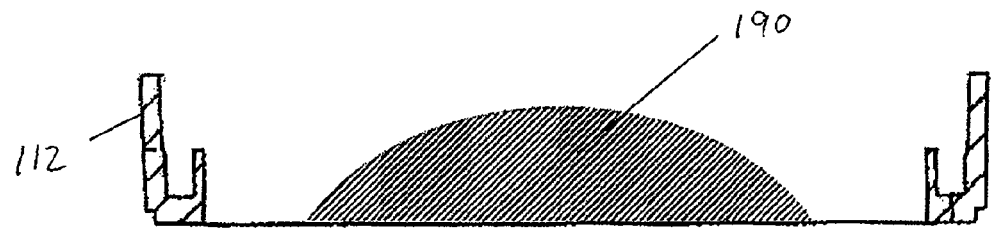
FIG. 18 is a diagrammatic cross-sectional view of an alternative lower cap of the light device shown in FIGS. 9 to 12.

As shown in FIG. 18, in a modified version of the light device 102, a reflector 190, in this example of generally convex configuration, is disposed in the lower cap 112 so as to reflect a portion of light from the lower cap 112 back through the body 110.

Figure 19:
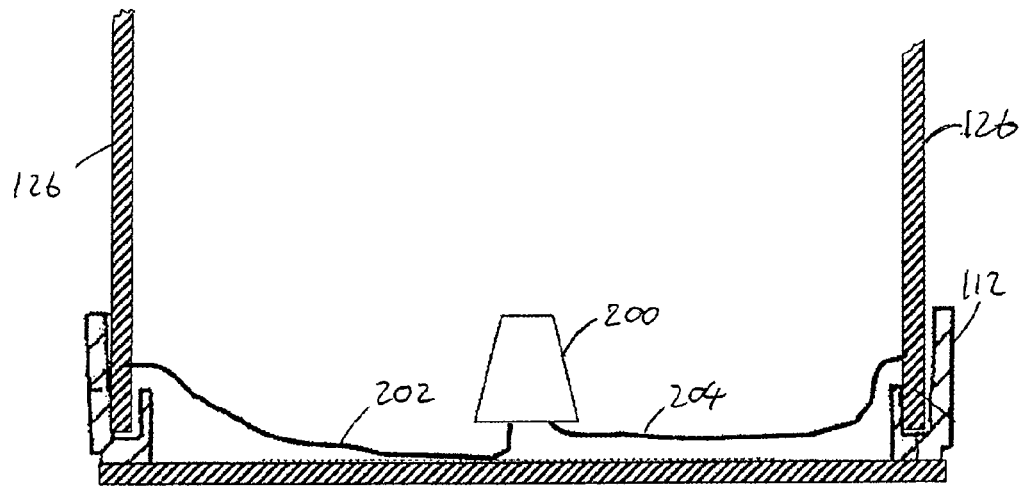
FIG. 19 is a diagrammatic cross-sectional view of the light device shown in FIGS. 9 to 12 provided with an additional light emitting device.

As shown in FIG. 19, in a further modified version of the light device 102, an additional light emitting device 200, which may be an LED, may be provided adjacent the lower cap 112, the light emitting device 200 being provided with electrical power through first and second wires 202, 204, each of which extends through one of the support elements 126, or through the support elements 126 themselves. In the variation shown in FIG. 19, the light emitting device 200 is disposed inwardly of the light device 102. However, it will be understood that as an alternative, the light emitting device 200 may be disposed outwardly of the lower cap 112 and, for example, directed downwards. Such an additional external light emitting device 200 may be connected to the lower cap 112 so as to be user adjustable to selectively vary the lighting direction.

Figure 14:
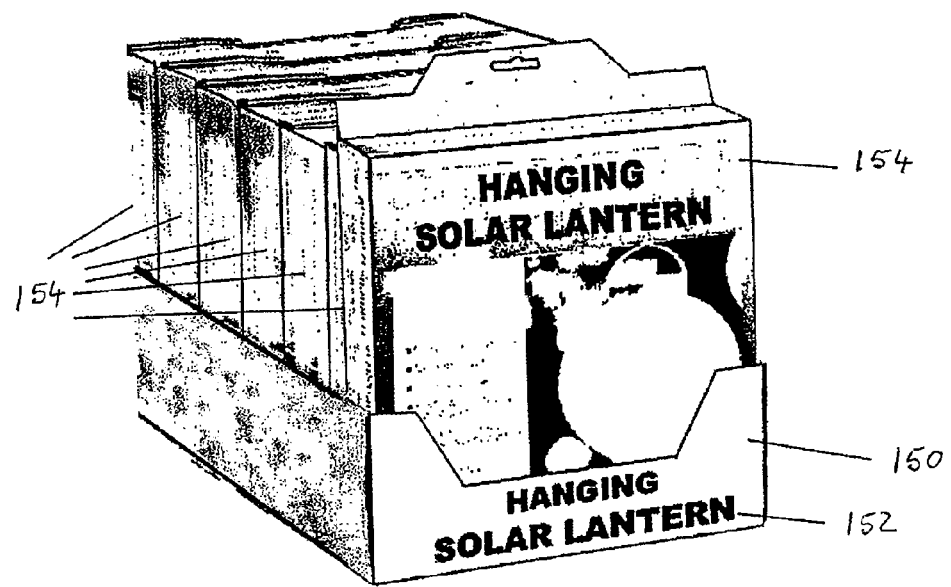
FIG. 14 is a diagrammatic perspective view of an arrangement for packaging the light device shown in FIGS. 9 to 13.

A display package 150 including package indicia 152 and several device packages 154 is shown in FIG. 14. Each device package 154 includes a light device 102 in a contracted configuration. As can be seen, by configuring the light device 102 so as to be positionable in a contracted configuration, it is possible to dispose the light device 102 in relatively compact packaging.

Figure 15:
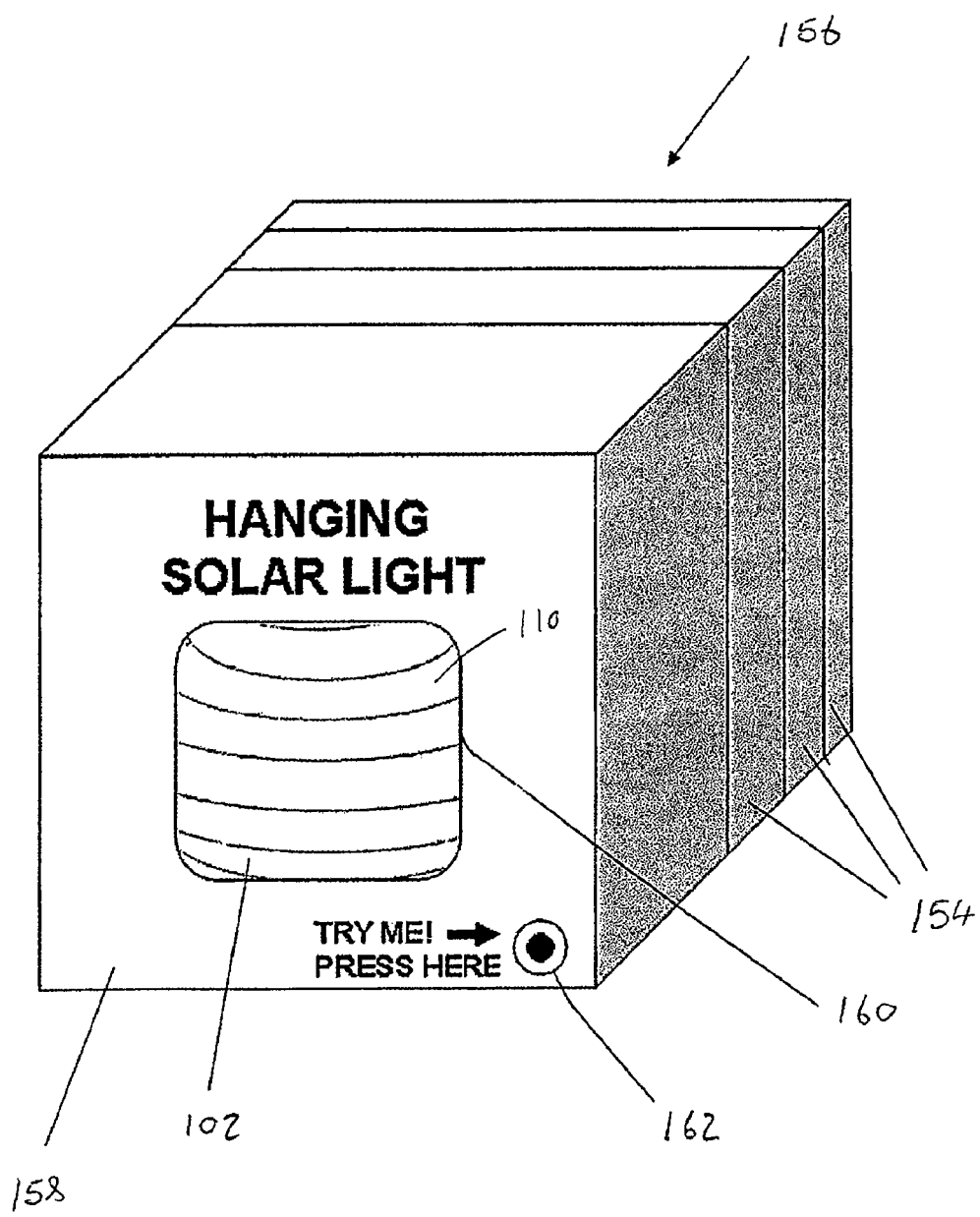
FIG. 15 is a diagrammatic perspective view of an alternative display package for the light device shown in FIGS. 9 to 13.

An alternative display package 156 is shown in FIG. 15. With this package 156, several device packages 154 having a light device 102 disposed in the contracted configuration are provided, and one device package 158 with the light device 102 disposed in an expanded configuration is provided. In this way, it is possible to save space by providing the majority of the light devices 102 in the contracted configuration, whilst enabling a prospective purchaser to view the light device 102 in the expanded configuration. Support devices for use with the light devices 102 may be packaged separately to the device packages 154, 158.

As an alternative, only one device package may be provided, with one device in an expanded configuration and several devices in a contracted configuration disposed in the package. Individual light devices may be separated using any suitable divider, for example formed of cardboard material.

The device package 158 includes a window 160 and, in this example, a test button 162 which, when pressed, supplies power to the LED 127 so as to illuminate the body 110.

The arrangement for enabling a user to test operation of the light device 102 by pressing the button 162 may be of a type described in co-pending U.S. patent application Ser. No. 11/107,940, the contents of which are hereby incorporated by reference.

Figure 16:
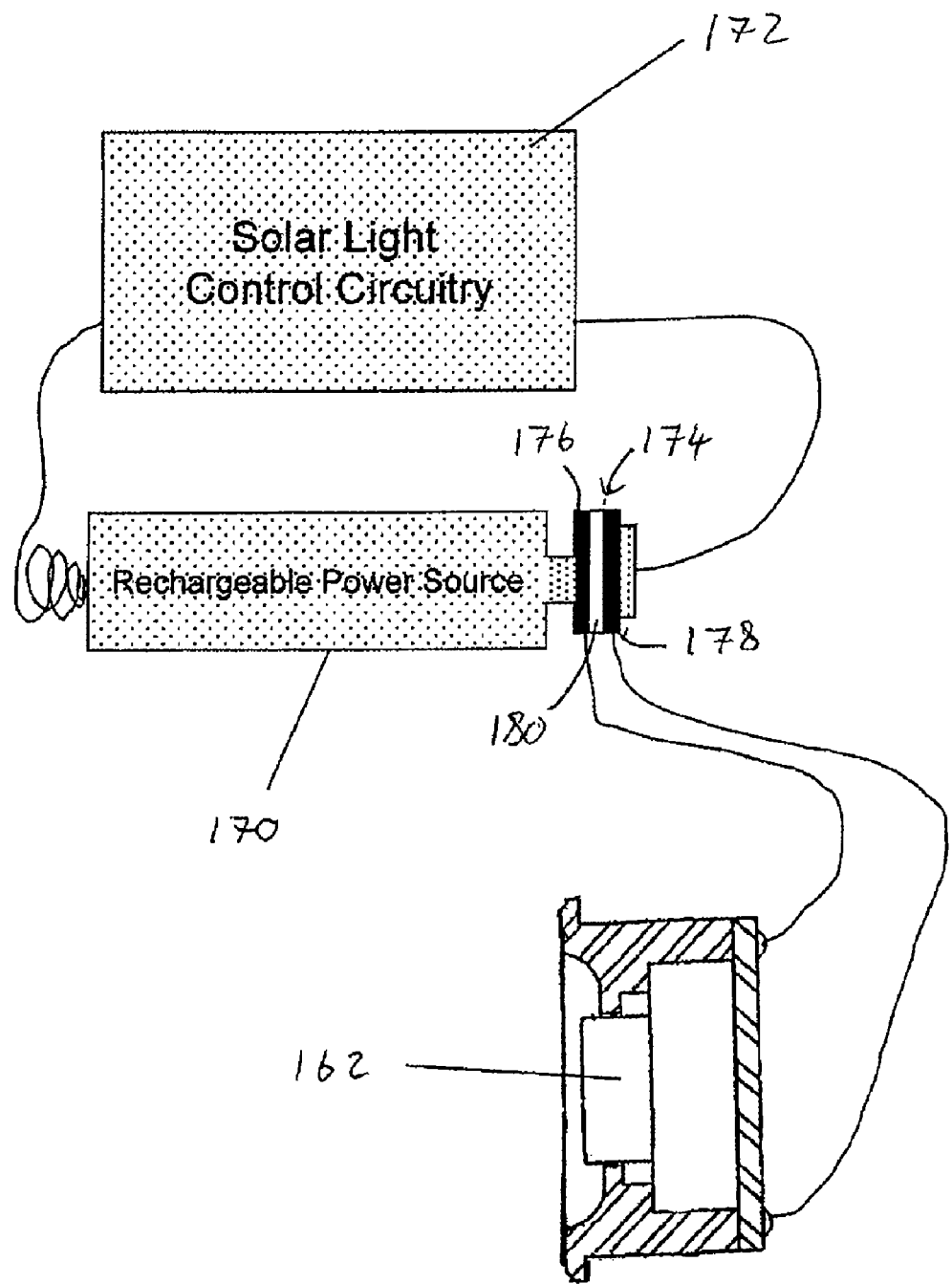
FIG. 16 is a schematic diagram of a test arrangement for facilitating testing of the light device by a user.

As shown in FIG. 16, the test arrangement is associated with a rechargeable power source 170 which may be a rechargeable battery, and the light device includes control circuitry 172 arranged to control and determine operation of the light device 102, for example so as to cause the light device 102 to operate in a similar way to the embodiment described above in relation to FIGS. 1 to 6.

Disposed between the rechargeable power source 170 and the control circuitry 172 is an insert 174 which has a first conductor 176 connected to the rechargeable power source 170 and the button 162, a second conductor 178 connected to the control circuitry 172 and the button 162, and an insulator 180 disposed between the first and second connectors. The arrangement is such that the rechargeable power source 170 is isolated from the control circuitry 172 until the button 162 is pressed. When the button 162 is pressed, an electrical connection is made between the first and second conductors 176, 178 and thereby between the rechargeable power source and the control circuitry 172.

Figure 17:
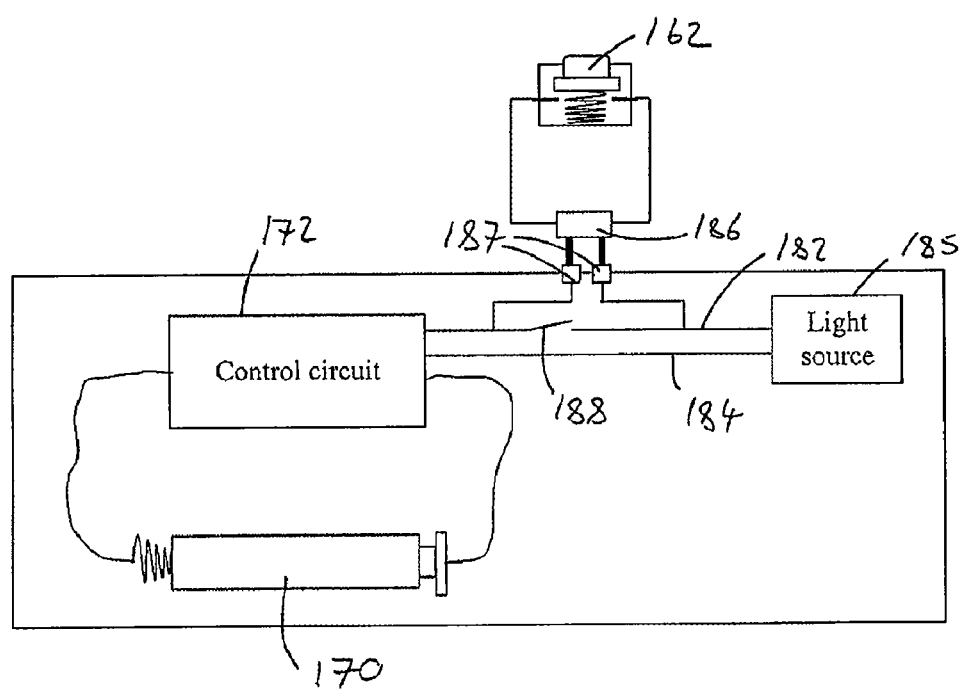
FIG. 17 is an alternative arrangement for facilitating testing of the light device by a user.

An alternative test arrangement is shown in FIG. 17, wherein instead of disposing the button 162 between the rechargeable power source 170 and the control circuitry 172, the button 162 is disposed in parallel with one of two power supply wires 182, 184 extending from the control circuitry 172 to a light source 185, in this example a first power supply line 182. The button 162 is connected to a plug 186 engageable with and disengageable from a socket 187, and disposed in line with the first power supply line 182 is a bypass switch 188. The arrangement is such that during a test mode, the plug 186 is engaged in the socket 187 and the bypass switch 188 is open. In this mode, the light source is prevented from receiving electrical power until the button 162 is pressed. During an operation mode, the plug 186 is disengaged from the socket 187 and the switch 188 is moved to a closed position. In this mode, the light source receives power through the first and second power supply lines, with an electrical current passing through the closed switch 188.

As with the light device 102, the support device 104 may be configured so as to be collapsible, in particular by configuring the support device 104 such that parts of the support device including the stake 106 and the hook 108 are releasable from and connectable to each other.

When a person is considering purchasing the light device 102, the person may wish to open the device package 158 in the retail store so as to more closely inspect the light device 102. In order to avoid creation of tension between the test button 162 and the insert 174 which may result in damage to the wiring system of the device packaging 158, one or more of the wires extending between the test button 162 and the insert 174 may be folded back on itself and the folded portion potted with glue or resin. This creates a strain relief point.

In order to reduce the likelihood that insufficient power is available for a user to test the light device by pressing the test button 162, one or more additional batteries may be included. The or each additional battery may be a rechargeable or non-rechargeable battery and in one arrangement, the additional battery is disposed in parallel or in series with the rechargeable battery 170.

Figure 20:
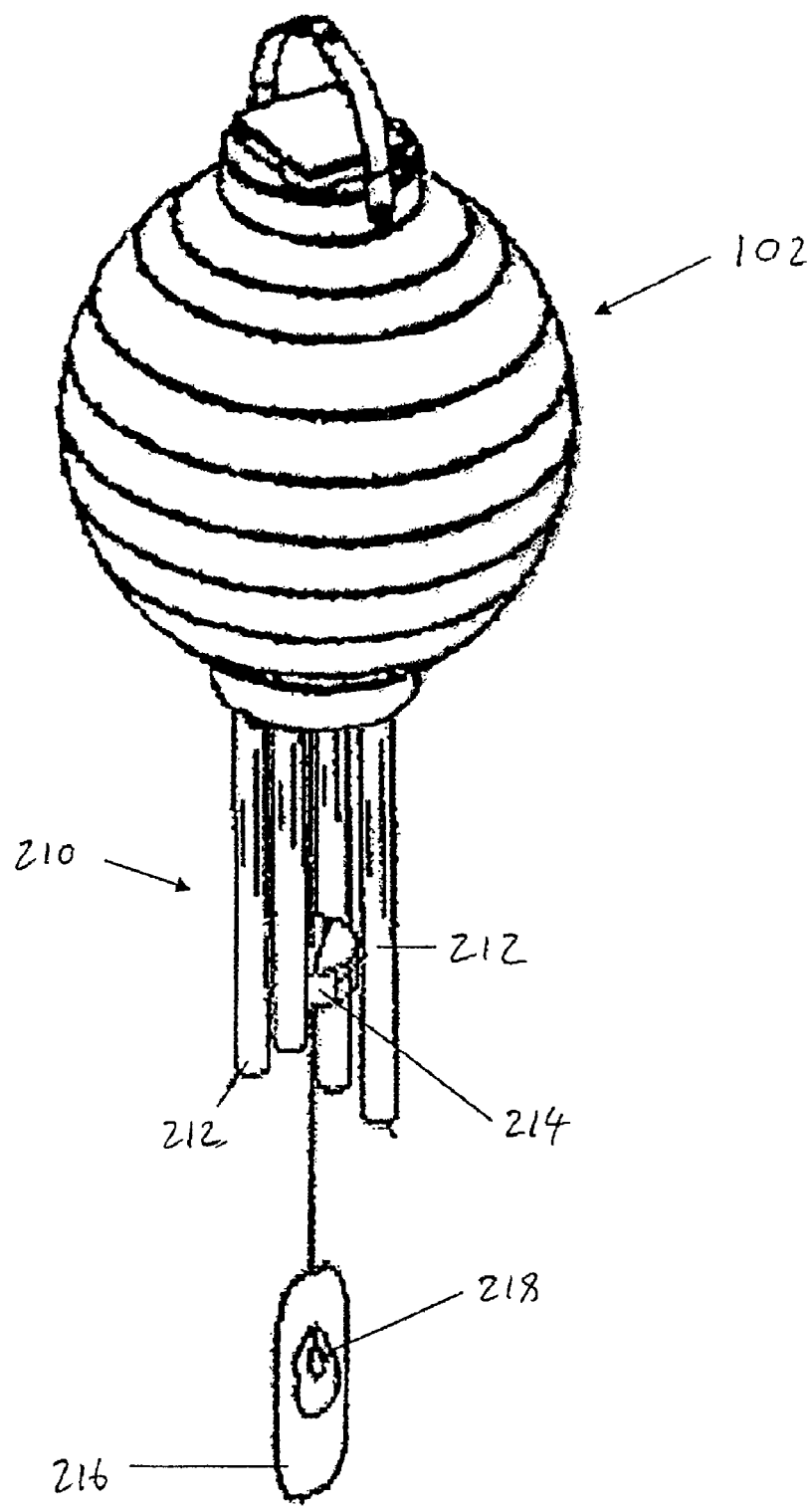
FIG. 20 is a diagrammatic perspective view of the light device shown in FIGS. 9 to 12 modified so as to include a wind indicating device.

A further variation to the light device 102 is shown in FIG. 20. In this variation, the light device 102 may be connected to a wind indicating device 210, for example of the type described in co-pending U.S. patent application Ser. No. 11/303,247 by the present applicant, the contents of which are hereby incorporated by reference.

The wind indicating device 210 includes several chime members 212, a striker 214, and a pendulum 216 which in this example is provided with a light emitting device 218. The light emitting device 218 may be provided with power through the support elements 126 in a similar way to the variation shown in FIG. 19.

In a further embodiment, a plurality of body portions are provided, each body portion having at least one associated light emitting element, and the body portions being disposed in a generally linear configuration during use.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

What is claimed is:

1. An outdoor lighting device, comprising:
  battery connections for at least one rechargeable battery;
  a solar module comprising:
    at least one solar cell mounted so as to be exposed to light and operatively associated with said connections to charge said at least one rechargeable battery;
    first electrical contacts electrically connected to said battery connections via a power circuit;
  a lighting module comprising:
    a lens;
    at least one light emitting element mounted to direct light through at least part of said lens;
    second electrical contacts electrically connected to said at least one light emitting element;
  wherein said solar module is mechanically and electrically connectable to and disconnectable from said lighting module, and when said solar module and said lighting module are mechanically connected together, the mechanical connection of the modules results in joining said first electrical contacts in an electrical and mechanical connection with said second electrical contacts and electrical current is able to pass, during normal use, between said at least one rechargeable battery and said at least one light emitting element; and
  a spike extending downwards for positioning said connections, said lighting module and said solar module above a ground surface.

2. The outdoor lighting device of claim 1, wherein a vertical arrangement of said lighting module and said solar module is removably aligned along a generally central axis of said light device.

3. The outdoor lighting device of claim 1, wherein said solar module further comprises a manually operable switch to control the output of said at least one light emitting element.

4. The outdoor lighting device of claim 1 wherein said battery connections are disposed within said solar module.

5. The outdoor lighting device of claim 1, wherein said light emitting element is at least one solid state diode that emits light of a fixed color.

6. The outdoor lighting device of claim 1, wherein said solar module is at least partly rotatable relative to said lighting module.

7. The outdoor lighting device of claim 1, wherein said solar module, said lighting module, said battery connections, and said spike are positioned in a generally fixed vertical spatial relationship to each other during use.

8. The outdoor lighting device of claim 1, wherein said light emitting element emits light of perceived varying intensity.

9. The outdoor lighting device of claim 8, wherein said lighting module comprises a simulated candle effect resulting from light emitted by said at least one light emitting element.

10. The outdoor lighting device of claim 1, wherein said light emitting element is disposed inside a portion of an at least partially translucent diffusing lens arranged so as to diffuse light passing therethrough from said at least one light emitting element.

11. The outdoor lighting device of claim 1, wherein said light emitting element is disposed inside a portion of an at least partially transparent lens arranged so as to allow light to passing therethrough from said at least one light emitting element.

12. A outdoor lighting device, comprising:
  a solar module comprising:
    battery connections for at least one rechargeable battery;
    at least one solar cell mounted so as to be exposed to light and operatively associated with said connections to charge said at least one rechargeable battery;
    first electrical contacts electrically connected to said battery connections via a power circuit;
  a lighting module comprising:
    a lens;
    at least one light emitting element mounted to direct light through at least part of said lens;
    second electrical contacts electrically connected to said at least one light emitting element;
  wherein said solar module is mechanically and electrically connectable to and disconnectable from said lighting module, and when said solar module and said lighting module are mechanically connected together, the mechanical connection of the modules results in positioning said first electrical contacts into contact to said second electrical contacts and electrical current is able to pass via said first and second contacts, during normal use, between said at least one rechargeable battery and said at least one light emitting element; and a vertically-oriented positioning member extending downwards for elevating and positioning said connections, said lighting module and said solar module above a ground surface.

13. The outdoor lighting device of claim 12, wherein said light emitting element is at least one solid state diode that emits light.

14. The outdoor lighting device of claim 13, wherein said solar module, said lighting module, said battery connections, and a spike are positioned in a generally fixed vertical spatial relationship to each other during illumination of said at least one light emitting element.

15. The outdoor lighting device of claim 14, wherein said solar module further comprises a manually operable switch to control the output of said at least one light emitting element.

16. The outdoor lighting device of claim 14, wherein said light emitting element is disposed inside a portion of an at least partially translucent diffusing lens arranged so as to diffuse light passing therethrough from said at least one light emitting element.

17. The outdoor lighting device of claim 14, wherein said solar module is at least partly rotatable relative to said lighting module.

18. The outdoor lighting device of claim 14, wherein said solar module, said lighting module, said battery connections, and said spike are positioned in a generally fixed horizontal spatial relationship to each other during illumination of said at least one light emitting element.

19. The outdoor lighting device of claim 12, wherein said vertically-oriented positioning member is a ground spike.

20. The outdoor lighting device of claim 12, wherein, when said solar module is connected to said lighting module, the first electrical contacts and the second electrical contacts include at least one contact formed of resilient electrically conductive material to ensure good electrical contact is achieved between connecting said first electrical contacts and said second electrical contacts.

* * * * *